(12) United States Patent
Viellard et al.

(10) Patent No.: US 9,909,706 B2
(45) Date of Patent: Mar. 6, 2018

(54) BRANCH STRUCTURES OF ELECTRICALLY-HEATED PIPE-IN-PIPE FLOWLINES

(71) Applicant: Acergy France SAS, Suresnes (FR)

(72) Inventors: Brice Viellard, Boulogne-Billancourt (FR); Leire Ayestaran Basagoitia, Tolosa-Gipuzkoa (ES)

(73) Assignee: Acergy France SAS, Suresnes (FR)

( * ) Notice: Subject to any disclaimer, the term of this patent is extended or adjusted under 35 U.S.C. 154(b) by 0 days.

(21) Appl. No.: 15/316,154

(22) PCT Filed: Jun. 1, 2015

(86) PCT No.: PCT/IB2015/001055
§ 371 (c)(1),
(2) Date: Dec. 2, 2016

(87) PCT Pub. No.: WO2015/185992
PCT Pub. Date: Dec. 10, 2015

(65) Prior Publication Data
US 2017/0122477 A1    May 4, 2017

(30) Foreign Application Priority Data
Jun. 3, 2014   (GB) .................................. 1409878.4

(51) Int. Cl.
*F16L 53/00* (2006.01)
*F16L 41/02* (2006.01)
(Continued)

(52) U.S. Cl.
CPC .......... *F16L 53/008* (2013.01); *E21B 17/003* (2013.01); *E21B 36/003* (2013.01);
(Continued)

(58) Field of Classification Search
CPC ................................. F16L 39/00; F16L 53/008
(Continued)

(56) References Cited

U.S. PATENT DOCUMENTS

| | | |
|---|---|---|
| 4,069,409 A | 1/1978 | Noland et al. |
| 4,815,769 A | 3/1989 | Hopperdietzel |

(Continued)

FOREIGN PATENT DOCUMENTS

| | | | |
|---|---|---|---|
| DE | 38 37 851 | 5/1990 | |
| DE | 202010007529 U1 * | 10/2011 | ............ F16L 53/008 |

(Continued)

*Primary Examiner* — David Bochna
(74) *Attorney, Agent, or Firm* — Levy & Grandinetti

(57) ABSTRACT

A flowline branch structure (10) has at least one inner branch assembly with an inner flowline branch and at least one inner flowline pipe attached to and communicating with the inner flowline branch. At least one outer branch assembly (12) of the flowline branch structure has an outer branch housing disposed around the inner flowline branch and at least one outer pipe (14) disposed around the inner flowline pipe and attached to the outer branch housing. A generally annular space is defined between the inner and outer branch assemblies. At least one wiring element including an electrical heating element is disposed in the sealed space on an outer side of the inner branch assembly. The, or each, wiring element extends in one continuous length across an interface between the inner flowline pipe and the inner flowline branch. This reduces the number of connections necessary to create the flowline branch structure.

16 Claims, 13 Drawing Sheets

(51) Int. Cl.
*F16L 59/16* (2006.01)
*E21B 17/00* (2006.01)
*E21B 36/00* (2006.01)
*E21B 36/04* (2006.01)
*E21B 47/00* (2012.01)
*E21B 47/06* (2012.01)

(52) U.S. Cl.
CPC ............ *E21B 36/04* (2013.01); *F16L 41/021* (2013.01); *F16L 59/163* (2013.01); *E21B 47/0001* (2013.01); *E21B 47/065* (2013.01)

(58) Field of Classification Search
USPC ..................................... 285/41, 123.3, 123.4
See application file for complete search history.

(56) References Cited

U.S. PATENT DOCUMENTS

| | | | | |
|---|---|---|---|---|
| 5,615,700 | A * | 4/1997 | Chaney | F16L 39/00 137/15.01 |
| 9,103,481 | B2 * | 8/2015 | Schwarzkopf | F16L 53/008 |
| 2014/0263433 | A1 * | 9/2014 | Merrifield | B67D 1/0867 285/41 |

FOREIGN PATENT DOCUMENTS

| | | | | |
|---|---|---|---|---|
| FR | 2994593 | A1 * | 2/2014 | ............ F16L 53/008 |
| GB | 2492883 | | 1/2013 | |
| WO | WO 02/16732 | | 2/2002 | |
| WO | WO 2005080850 | A1 * | 9/2005 | ............ F16L 53/008 |
| WO | WO 2014/029644 | | 2/2014 | |

\* cited by examiner

BRANCH STRUCTURES OF ELECTRICALLY-HEATED PIPE-IN-PIPE FLOWLINES

BACKGROUND OF THE INVENTION

(1) Field of the Invention

This invention relates to the use of electrical heating such as electrical trace heating (ETH) to maintain internal temperature in subsea pipelines used for the production of oil and gas. The invention is especially concerned with providing heating across a discontinuity in a pipeline, particularly across a branch structure such as a tee or wye connection.

(2) Description of Related Art

Subsea pipelines are used in oil and gas production to transport crude oil and/or natural gas from a subsea wellhead across the seabed on their way toward the surface. Typically, in offshore locations, the oil and gas flows up a riser from the seabed to the surface to undergo treatment and temporary storage at a surface installation such as a platform or a floating production, storage and offloading vessel (FPSO).

Oil and gas are present in subterranean formations at elevated temperature and pressure, which may if necessary be increased by the injection of fluids such as steam. On production of the oil or gas, the produced fluid emerges from the wellhead and enters the pipeline in a multi-phase state. For example, in the case of oil, liquid crude oil will generally be mixed with water and gas.

During subsequent transportation along the pipeline, the temperature and pressure of the produced fluid have to be maintained at levels that are high enough to ensure a sufficient flow rate. In particular, various measures are taken to ensure that the internal temperature of the pipeline remains high, typically above 200° C., despite thermal exchange with seawater which, for example, is at 4° C. below 1000 m depth.

Low temperature increases viscosity and promotes precipitation of solid-phase material in the production fluid, namely waxes and asphaltenes in crude oil and hydrates in natural gas. Such solid-phase materials tend to deposit on the inner wall of the pipeline and may eventually cause plugs, which will interrupt production. Aside from the obvious cost of lost production, plugs are difficult and expensive to remove and can even sever the pipeline itself.

In addition, an oil or gas field must occasionally be shut down for maintenance reasons. During shut-down, production is stopped and so no hot fluid flows through the pipeline. Consequently, to avoid clogging by solid-phase materials, mitigating fluid such as methanol or diesel oil is injected into the pipeline during shut-down; also, when production restarts, temperature must be increased quickly so that no plugs will form.

Two approaches to temperature management are used alone or in combination in subsea pipelines. Those approaches may be characterised as passive measures and active measures.

In passive temperature-management systems, the pipeline is thermally insulated, typically by a layered external coating of plastics material or by a sandwich structure employing alternating plastics insulating layers and steel layers. An example of a passive system is a rigid but bendable pipe-in-pipe (PiP) structure comprising an internal, fluid-carrying pipe and an outer pipe separated by an insulating annulus. Typically, insulating material is disposed in the annulus; it is also possible to draw down a partial vacuum in the annulus.

In active temperature-management systems, a heating system typically employs hot-water pipes or electrical heating elements arranged around the pipeline. For example, ETH employs highly-resistive electric wires running along the outer surface of a steel pipeline. Heat produced by passing an electric current along the wires is conducted to the inner surface of the pipeline and from there to the production fluids flowing within.

Whatever temperature-management system is employed, it is important to maintain continuity of thermal management along the length of a pipeline. Otherwise, 'cold spots' will arise and these will increase the likelihood of plugs forming at those locations.

It is relatively straightforward to maintain continuous thermal management along a continuously tubular pipe length comprising pipe sections such as joints or stalks welded end-to-end. It is more challenging to maintain continuous thermal management where tubular pipe lengths of a pipeline are interrupted by structures or accessories such as those that are necessary to define a branch. Such branch structures may be described as tees or wyes, depending on their shape. The remainder of this specification discusses tees, although wyes involve the same problems and solutions and are therefore also embraced by the inventive concept.

A tee is generally a forged junction piece whose main ends are welded to pipe lengths of the pipeline, thus forming part of a main flowline. A branch section of the tee between the main ends is welded or otherwise connected to another pipe length that intersects and communicates with the pipeline via the tee. That other pipe length may, for example, be a short pipe section called a spool or jumper that connects the tee to another tee of another pipeline, or to a wellhead.

In subsea production systems, a tee is the main piping component of a pipeline accessory structure known as an 'in-line tee' or ILT. An ILT comprises the tee itself, pipes, a valve and/or a connector hub welded to the branch, and a support structure comprising a frame and a foundation such as a mudmat. A spool or jumper connects the connector hub of the ILT to another ILT or to a wellhead.

An ILT may be assembled into a pipeline during offshore pipe-laying to be laid on the seabed with the adjoining pipe lengths as part of the pipeline. In that case, the ILT is suitably welded to the adjoining pipe lengths on a pipelaying vessel that fabricates and launches the pipeline. Alternatively, an ILT may be coupled to pipe lengths on the seabed, in which case the ILT and the adjoining pipe lengths may comprise remotely-operable couplings.

References in the forthcoming description to an ILT relate to the main piping of an ILT structure. Thus, elements of an ILT other than the main piping are omitted to simplify the drawings and the related description.

Similar structures with branches may be used at the ends of a pipeline, where they are known as pipeline end terminations (PLETs) or flowline end terminations (FLETs).

A single branch structure may comprise more than one tee. For example, the embodiment of the invention to be described is a double ILT in which a single structure comprises two tees. Indeed, a single forged piece could comprise more than one tee-shaped branch. However, single ILTs with one tee are also contemplated by the invention, as are branch structures with more than two tees.

WO 02/16732 describes heating of a single-walled pipeline using a heating layer disposed between the outer pipe surface and thermal insulating material around the pipe.

However, WO 02/16732 does not teach how to lay wires, insulating material or an outer pipe around a branch structure such as a tee.

GB 2492883 describes a typical PiP ETH flowline section of the type used with the present invention. In GB 2492883, a pipe section comprises an inner pipe, heating elements, thermal insulation and an outer pipe. Specific connectors are designed to improve the connection of successive pipe sections. However, again, no provision is made for discontinuities such as branch structures in the architecture of the pipeline.

WO 2014/029644 describes a tee for connecting PiP ETH flowlines that combine a passive PiP insulating structure with active electrical trace heating. So, WO 2014/029644 has the same general objectives as the present invention. The tee in WO 2014/029644 comprises an inner shell, an outer shell defining an annulus around the inner shell, electrical wires extending between connection points on opposite sides of the branch of the tee, and a thermal insulation layer inside the annulus around the inner shell.

The approach taken by WO 2014/029644 gives rise to additional connection points, which the present invention seeks to avoid because reducing the number of interfaces improves the reliability of the system. Thus, the invention seeks to maximise the continuity of thermal management of a PiP ETH flowline, while minimising the number of electrical connections that are necessary to create the ETH system.

It is against this background that the present invention has been devised.

BRIEF SUMMARY OF THE INVENTION

In one sense, the invention resides in a flowline branch structure having: at least one inner branch assembly comprising an inner flowline branch and at least one inner flowline pipe attached to and communicating with the inner flowline branch; at least one outer branch assembly comprising an outer branch housing disposed around the inner flowline branch and at least one outer pipe disposed around the inner flowline pipe and attached to the outer branch housing; a space defined between the inner and outer branch assemblies; and at least one wiring element disposed in the space on an outer side of the inner branch assembly and extending in one continuous length across an interface between the inner flowline pipe and the inner flowline branch.

The, or each, wiring element may also extend from the interface in one continuous length across a full length of the inner flowline pipe or the inner flowline branch.

The, or each, wiring element may be interrupted or terminated by a connection. That connection is most conveniently and accessibly disposed on the inner flowline branch, although the connection could for example be disposed on the inner flowline pipe instead.

In comparison with WO 2014/029644, the approach adopted by the invention minimises the number of electrical connections that are necessary. For example, a tee in series with two pipe lengths involves two pipe-tee interfaces. In WO 2014/029644, this requires two connections, one at each interface. In contrast, the present invention allows just one connection to be used.

The, or each, wiring element may extend in one continuous length across a full length of the inner flowline pipe and the inner flowline branch, between opposed ends of the inner branch assembly. Also, the, or each, wiring element may extend continuously from the interface to overlap beyond an end of the inner flowline pipe or the inner flowline branch, which end is remote from the interface.

At least one wiring element is suitably an electrical heating element or a data-carrying element.

Elegantly, at least one wiring element may be diverted or branched from a generally longitudinal orientation to lie beside a secondary tubular bore that is in fluid communication with a main tubular bore of the inner flowline branch.

The space defined between the inner and outer branch assemblies suitably contains thermally-insulating material that covers an external surface of the inner branch assembly and the, or each, wiring element. The space is preferably sealed, even if the space may only be closed and hence sealed by virtue of an end wall spaced along the pipeline.

A flowline branch structure of the invention may comprise: first and second inner branch assemblies, each comprising an inner flowline branch; at least one inner flowline pipe attached to and communicating with the inner flowline branch of at least one of the inner branch assemblies; first and second outer branch assemblies each comprising an outer branch housing disposed around a respective inner flowline branch and at least one outer pipe disposed around the inner flowline pipe and attached to the outer branch housing; and a space defined between the first and second inner branch assemblies and the first and second outer branch assemblies.

The inventive concept extends to a subsea flowline or a subsea installation comprising at least one of the flowline branch structures of the invention.

The inventive concept also embraces a method of constructing a flowline branch structure, comprising laying at least one wiring element on an outer side of an inner branch assembly having at least one inner flowline pipe attached to an inner flowline branch, to extend in one continuous length across an interface between the inner flowline pipe and the inner flowline branch.

The, or each, wiring element may be laid to extend from the interface in one continuous length across a full length of the inner flowline pipe or the inner flowline branch, or in one continuous length across a full length of the inner flowline pipe and the inner flowline branch, between opposed ends of the inner branch assembly.

The, or each, wiring element may be laid to extend continuously from the interface to overlap beyond an end of the inner flowline pipe or the inner flowline branch, which end is remote from the interface. In that case, the method may further comprise attaching a further inner flowline pipe or inner flowline branch to the inner branch assembly and laying the overlap of the, or each, wiring element on that further inner flowline pipe or inner flowline branch. The overlap may then extend in one continuous length across a full length of the further inner flowline pipe or inner flowline branch, as the case may be.

The method of the invention may comprise attaching at least one inner flowline pipe to the inner flowline branch before laying the wiring element, and may further comprise laying thermally-insulating material over an outer side of the inner branch assembly and upon the, or each, wiring element.

An outer branch housing may be placed around the inner flowline branch and at least one outer pipe may be placed around the inner flowline pipe and attached to the outer branch housing to define a space between the inner branch assembly and an outer branch assembly comprising the outer branch housing and the outer pipe.

In one sense, a flowline element of the invention comprises: an inner branch such as a tee; at least one inner pipe welded to the inner branch to form an inner branch-pipe assembly; and at least one electrical heating element on an outer surface of the inner branch-pipe assembly extending between a free end of the branch and the opposite end of the pipe in one continuous length, with no intermediate connection. The flowline element of the invention further comprises an outer branch structure and at least one outer pipe welded to the outer branch structure to form an outer branch-pipe assembly, the outer pipe at least partially covering the inner pipe.

An annulus defined between the inner branch-pipe assembly and the outer branch-pipe assembly contains insulating material that suitably covers the inner branch-pipe assembly and the, or each, electrical heating element.

The flowline element of the invention may comprise two or more inner branches, at least one inner pipe communicating between the inner branches, electrical heating elements extending between outer ends of each branch in one continuous length. Again, such an element may comprise insulating material, two or more outer branch structures and at least one outer pipe.

In some expressions of the inventive concept, the invention provides a thermally-insulated and electrically-heated branch structure being an element of a thermally-insulated and electrically-heated subsea flowline. The branch structure has an inner branch assembly comprising: an inner branch piece for transporting a fluid, having a main tubular bore and at least one secondary tubular bore in fluid communication with the main tubular bore and extending laterally or transversely relative to a central longitudinal axis of the main tubular bore; and at least one inner pipe for transporting a fluid, attached to one end of the main tubular bore of the inner branch piece.

An outer branch shell is assembled around the inner branch piece. At least one outer pipe or pipe string is welded to the outer branch shell and at least partially covers the inner pipe.

A generally annular space is defined between the inner branch assembly and an outer branch assembly comprising the outer branch shell and the outer pipe. That space contains: at least one electrical heating wire laid generally longitudinally along an external surface of the inner branch assembly; and thermally-insulating material that covers the external surface of the inner branch assembly and the, or each, electrical heating wire. The, or each, electrical heating wire runs in one continuous length from a first end of the inner branch assembly to an opposite end of the inner branch assembly.

Fibre-optic cable may be laid along the inner branch assembly in addition to the electrical heating wire. The electrical heating wire may be a cable.

A branch or diversion of the electrical heating wire, connected to a longitudinal electrical heating wire, may run along or lie against a branch of the pipe containing the secondary tubular bore.

The branch structure element of the invention may be supported on the seabed by a structure such as a frame and foundation of an ILT.

Another pipe or pipe string may be welded or otherwise attached to another side of the branch structure, in which case the, or each, electrical heating wire may also extend along that pipe or pipe string to the end.

In other expressions of the inventive concept, the invention provides an inner branch assembly comprising: a first inner branch piece for transporting a fluid, having a main tubular bore and at least one secondary tubular bore in fluid communication with the main tubular bore and extending laterally relative to a central longitudinal axis of the main tubular bore; at least one inner pipe for transporting a fluid, attached at a first end to an end of the main tubular bore of the first inner branch piece; and a second inner branch piece for transporting a fluid, having a main tubular bore and at least a secondary tubular bore in fluid communication with the main tubular bore and extending laterally or transversely relative to a central longitudinal axis of the main tubular bore, the second inner branch piece being attached to a second end of the inner pipe remote from the first inner branch piece. At least one electrical heating wire runs in one continuous length from a first end of the inner branch assembly to a second, opposite end of the inner branch assembly.

First and second outer branch shells are assembled around the first and second inner branch pieces respectively such that a generally annular space is defined between the inner branch assembly, the outer branch shells and at least one outer pipe extending between the outer branch shells along the inner pipe. That space contains thermally-insulating material that covers the external surface of the inner branch assembly and the, or each, electrical heating wire.

The inventive concept extends to a production flowline comprising at least one of the thermally-insulated and electrically-heated branch structure elements or inner branch assemblies of the invention.

The inventive concept also embraces a method for assembling a thermally-insulated and electrically-heated branch structure element of a thermally insulated and electrically heated flowline. In some expressions of the inventive concept, the method comprises: welding an inner pipe or pipe string to an inner branch piece; laying at least one electrical heating wire along an outer surface from one end of the inner branch piece to the opposite end of the inner pipe or pipe string; covering the outer surface of the inner pipe or pipe string, including the, or each, electrical heating wire, with a thermal insulation material; placing an outer pipe or pipe string around the inner pipe or pipe string covered by the thermal insulation material; covering the outer surface of the inner branch piece, including the, or each, electrically heating wire, with a thermal insulation material; and placing an outer branch shell around the inner branch piece covered by the thermal insulation material.

An electrical heating wire branch or diversion may be laid upon a branch protrusion of the inner branch piece. At least one optical fibre section may be laid along the outer surface of the inner pipe string or the inner branch piece.

The inner pipe or pipe string and the outer pipe or pipe string may be connected mechanically by at least one spacer or centraliser. It is also possible for the inner pipe or pipe string and the outer pipe or pipe string to be connected mechanically by a termination bulkhead, which bulkhead preferably comprises one or more bores for passing one or more electrical heating wires through the bulkhead. More generally, an end wall may be welded or screwed on the inner pipe or pipe string and may comprise openings for passing the electrical heating wire through an interface between the end wall and the inner pipe or pipe string Separate sections of fibre-optic cable are suitably connected by junction boxes positioned, for example, on the outer surface of the inner branch piece. The continuity of the, or each electrical heating wire is preferably tested, along with the data-carrying capability of any data connection such as a fibre-optic cable.

To seal the space around the inner pipe or pipe string and the inner branch piece, an end wall or end piece can be located at a remote end of a pipe string or pipeline incorporating a product of the invention. Such a pipeline may be several kilometers long.

To improve insulation in conjunction with a covering of solid insulation, a vacuum may be drawn down in a sealed space around the inner pipe or pipe string and the inner branch piece.

The method of the invention may also be expressed as: attaching an inner pipe or pipe string to a first inner branch piece to form a pipe and branch assembly; laying at least one electrical heating wire along an outer surface from one end of the inner branch piece to the opposite end of the inner pipe or pipe string, leaving an overlength of electrical heating wire exceeding the length of the pipe and branch assembly; covering the outer surface of the inner pipe or pipe string, including the, or each, electrical heating wire, except the overlength, with thermal insulation material; placing an outer pipe or pipe string around the inner pipe or pipe string covered by the thermal insulation material; attaching a second inner branch piece to a free end of the inner pipe or pipe string; arranging the overlength of electrical heating wire along an outer surface of the second inner branch piece such that the electrical heating wire runs continuously from a free end of the first inner branch piece to a free end of the second inner branch piece; covering outer surfaces of the first and second inner branch pieces, including the, or each, electrical heating wire, by thermal insulation material; and placing first and second outer branch shells around the first and inner branch pieces respectively covered by the insulation material.

BRIEF DESCRIPTION OF THE DRAWINGS

In order that the invention may be more readily understood, reference will now be made, by way of example, to the accompanying drawings in which.

DETAILED DESCRIPTION OF THE INVENTION

Figure 1:
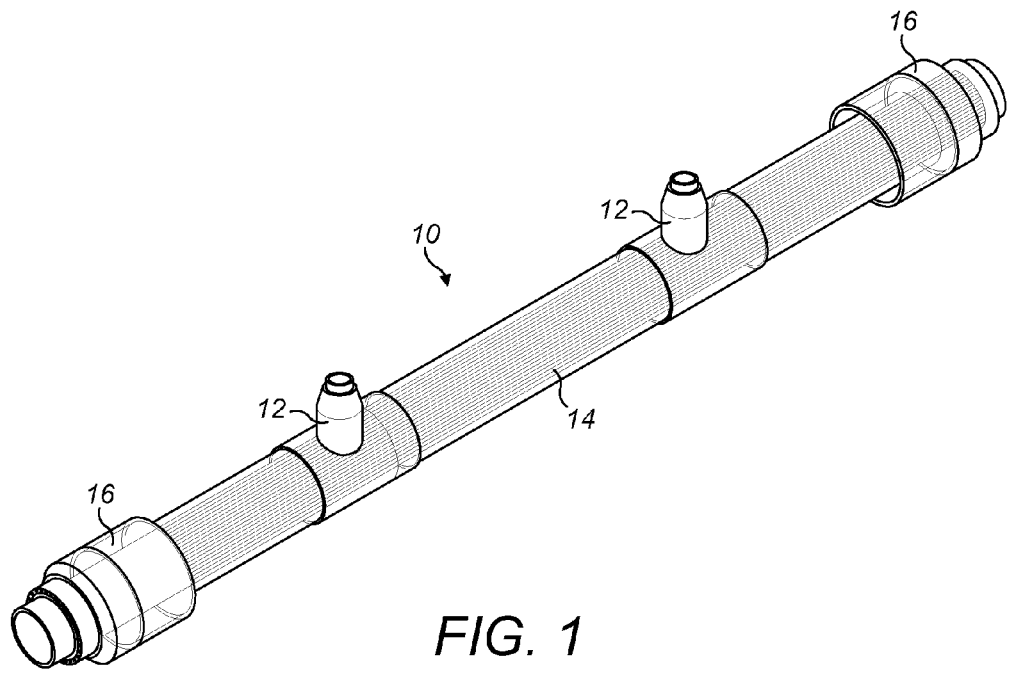
FIG. 1 is a perspective view of an ILT in accordance with the invention.

FIG. 1 shows an ILT 10 as an example of a branch structure of the invention. In this example, the ILT 10 is a double ILT and so comprises two tee structures each generally indicated at 12, separated by a short portion of flowline generally indicated at 14.

As will be explained, the flowline portion 14 is of PiP construction comprising inner and outer pipes separated by annulus. The annulus is kept dry and is filled with an insulation material that is configured to meet the thermal requirements of the particular subsea project. Internal air pressure may also, or alternatively, be reduced in the annulus to improve insulation. Similarly, the tee structures 12 comprise inner and outer parts that are spaced apart and insulation is disposed in the gap between those parts.

The outer pipe of the flowline portion 14 is designed to withstand the hydrostatic pressure dictated by the projected water depth and the stresses imparted by the chosen installation method, such as J-lay, and by thermal expansion cycles when in place on the seabed. The inner pipe of the flowline portion 14 can be located within the outer pipe by the use of centralisers or spacers clamped at discrete intervals along the inner pipe. However, centralisers or spacers may be omitted, for example where the compressive strength of any insulation material is sufficient to maintain spacing between the inner and outer pipes during installation and in use.

Figure 2:
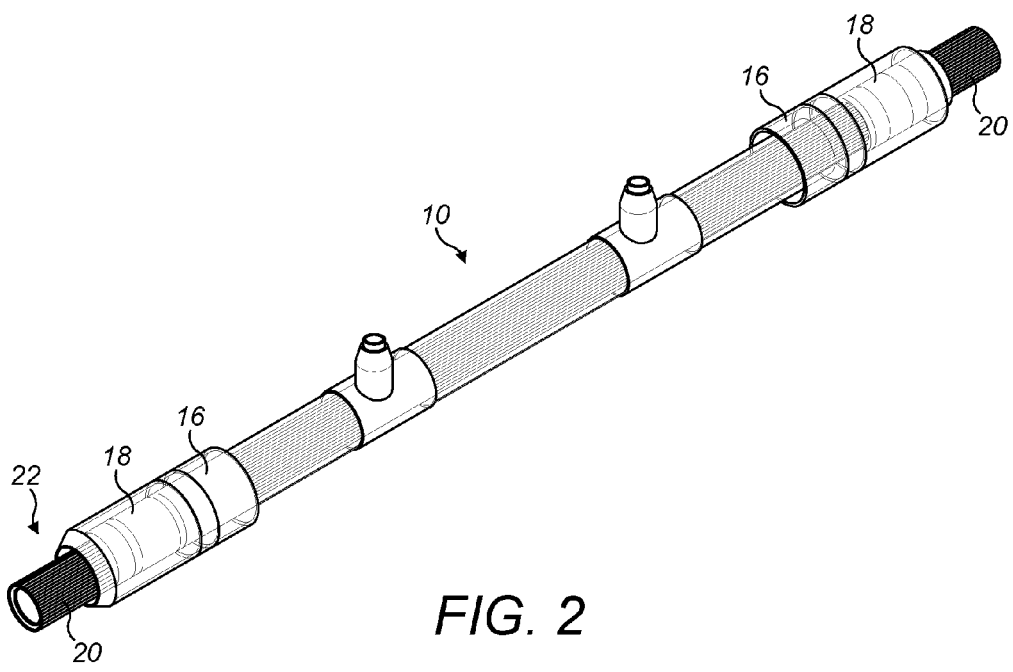
FIG. 2 is a perspective view of the ILT of FIG. 1 incorporated into a subsea pipeline.

In the example shown, penetrator couplings 16 are disposed at each end of the ILT 10, welded to respective ones of the tee structures 12. As FIG. 2 shows, the penetrator couplings 16 engage with female couplings 18 of respective pipe lengths 20 of a subsea pipeline generally indicated at 22, thus integrating the ILT 10 as part of the pipeline 22.

FIGS. 3 to 11 show various components of the ILT 10. FIGS. 12 to 23 show how those components are assembled to make the ILT 10, while FIG. 24 is a flow chart illustrating methods of the invention.

Figure 3:
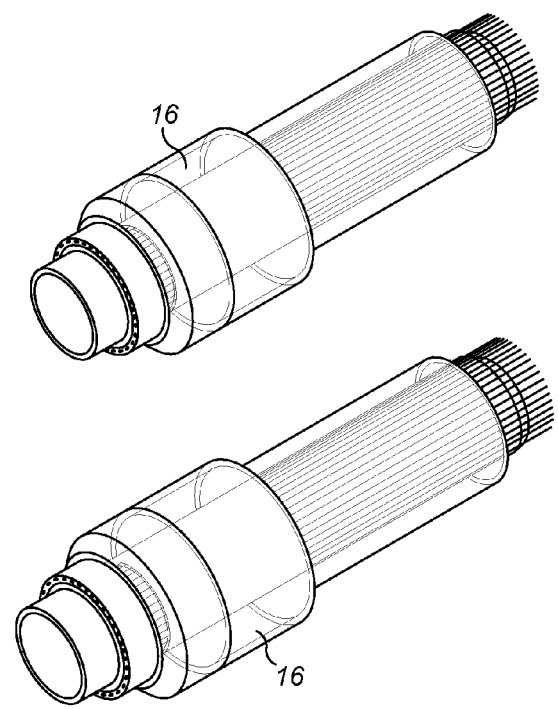
FIG. 3 is a perspective view of two penetrator couplings of the ILT of FIG. 1.
Figure 4:
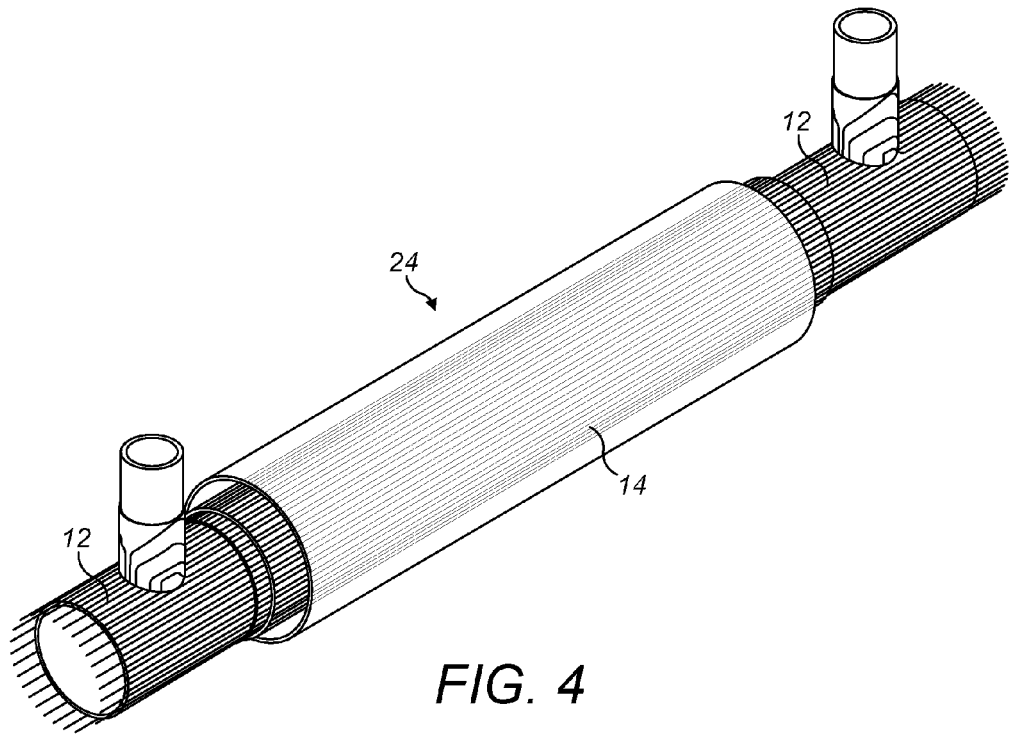
FIG. 4 is a perspective view of a tee assembly disposed between the penetrator couplings of the ILT of FIG. 1.

FIG. 3 shows two of the penetrator couplings 16 whereas FIG. 4 shows a tee assembly 24 to be disposed between the penetrator couplings 16. The tee assembly 24 comprises the tee structures 12 and the flowline portion 14, which are further particularised now with reference to FIGS. 5 to 11.

Figure 5:
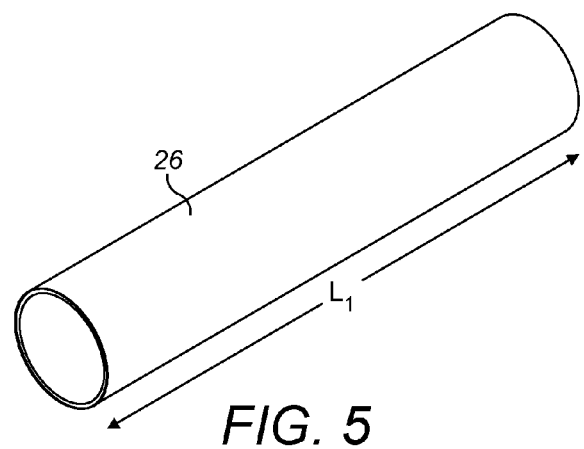
FIG. 5 is a perspective view of an inner pipe being part of the tee assembly shown in FIG. 4.

FIG. 5 shows a steel inner pipe 26 of the PiP flowline portion 14. The inner pipe 26 is a tube of circular cross-section and has a length $L_1$ from end to end.

Figure 6:
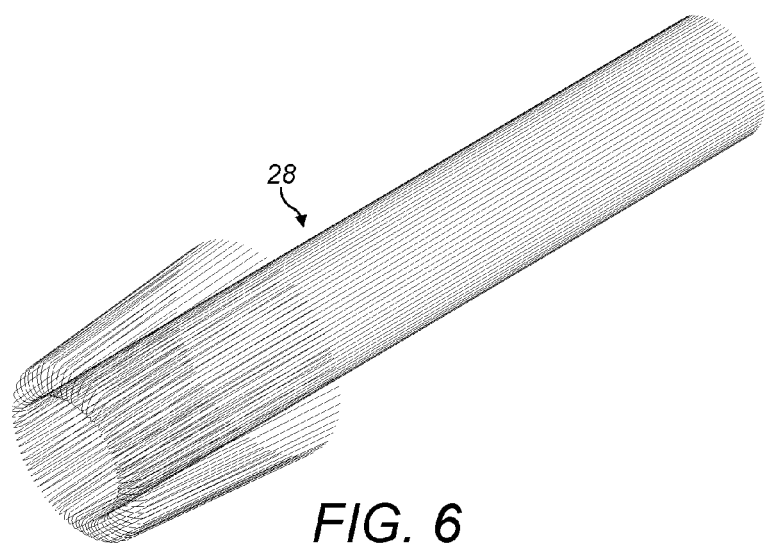
FIG. 6 is a perspective view of heater wiring being part of the tee assembly shown in FIG. 4.

FIG. 6 shows wiring elements generally indicated at 28. As will be explained, the wiring elements 28 comprise electrical heating elements and optionally also data-carrying elements. In this example, the heating elements are electrical resistance elements and the data-carrying elements are optical fibres. The wiring elements 28 are preferably flexible to allow them to be bent as shown to facilitate positioning of the elements 28 during assembly of the ILT 10, as will be described.

Whilst shown collectively in FIG. 6 for convenience, the wiring elements 28 are laid individually against the outer surface of the inner pipe 26 as will be explained. When so laid, the wiring elements 28 are spaced around the circumference of the inner pipe 26 with the heating elements in heat-conducting contact with the inner pipe 26. Whilst the wiring elements 28 follow individual paths, all of them extend generally longitudinally in a direction parallel to the central longitudinal axis of the inner pipe 26.

Figure 7:
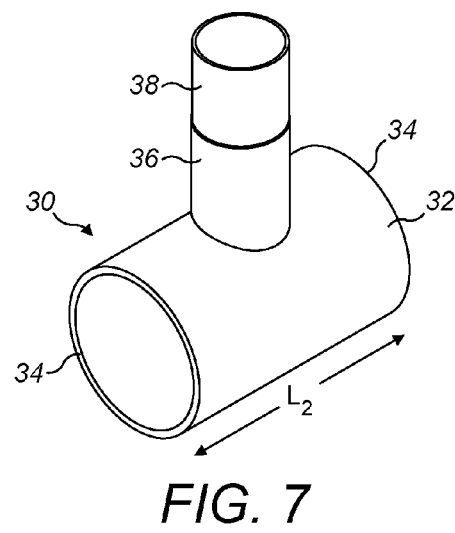
FIG. 7 is a perspective view of one of two tee forgings that are part of the tee assembly shown in FIG. 4.

FIG. 7 shows inner parts of one of the two tee structures 12. Specifically, a tee forging 30 comprises a tubular flowline portion 32 that has opposed main ends 34 and has a length $L_2$ from one main end 34 to the other. The inner and outer diameters and the wall thickness of the flowline portion 32 substantially match those of the inner pipe 26. This facilitates welding one of the main ends 34 of the tee forging 30 to an abutting end of the inner pipe 26 and maintains structural continuity. A penetrator coupling 16 as shown in FIGS. 1 and 2 is welded to the other main end 34 of the tee forging 30.

An integral branch portion 36 of the tee forging 30 intersects and communicates with the flowline portion 32. An optional tubular pup piece 38 is welded to the outer end of the branch portion 36.

In a subsea installation, the branch portion 36 or any pup piece 38 attached to the branch portion 36 is welded or otherwise coupled to another pipe, not shown. That other pipe could be a spool or jumper extending across the seabed to a wellhead or, via another tee structure, to another flowline.

Figure 8:
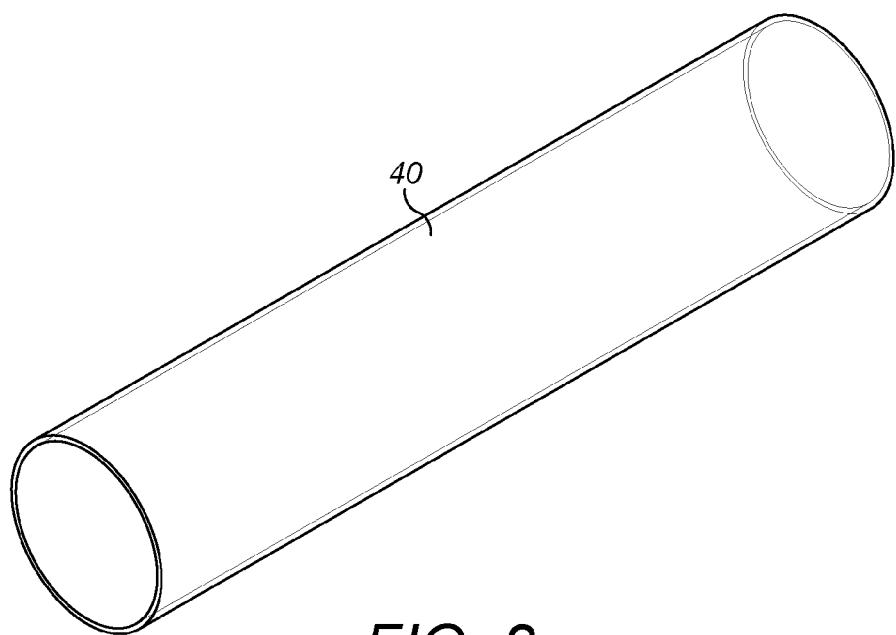
FIG. 8 is a perspective view of an insulating sleeve being part of the tee assembly shown in FIG. 4.

FIG. 8 shows a tubular insulating sleeve 40, for example of a silica-based mineral such as Izoflex™ as supplied by ITP Interpipe SA of France. The sleeve 40 is of one piece to be slid along the inner pipe 26 outside the wiring elements 28 already laid along the outside of the inner pipe 26. However, the sleeve 40 could be divided longitudinally into two or more pieces to be assembled around the inner pipe 26 outside the wiring elements 28. In either case, the inner diameter of the sleeve 40 is slightly greater than the outer diameter of the inner pipe 26 so as to accommodate the thickness of the wiring elements 28 laid on the inner pipe 26.

Other well-known insulating measures may be taken instead or in addition to the sleeve 40 of Izoflex™, for example by choosing a different insulating material or by creating a partial vacuum in an annulus around the inner pipe 26. The latter approach is taken in the preferred embodiments, as will be described later.

Figure 9:
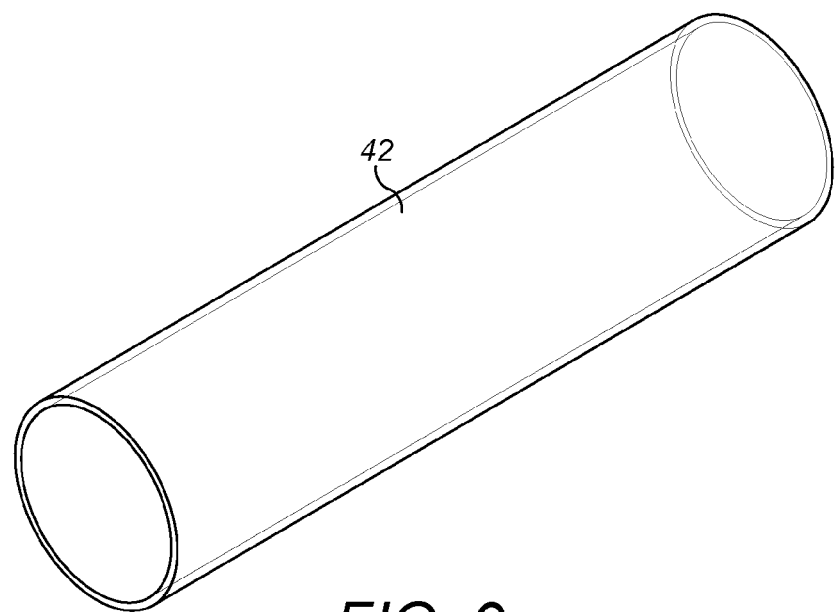
FIG. 9 is a perspective view of an outer pipe arranged to fit around the insulating sleeve of FIG. 8 in the tee assembly of FIG. 4.

FIG. 9 shows the outer pipe 42 of the PiP flowline portion 14. The outer pipe 42 is a tube of circular cross-section, whose inner diameter is greater than the outer diameter of the insulating sleeve 40. Between them, the outer pipe 42 and the inner pipe 26 define the annulus that contains the insulating sleeve 40.

Figure 10:
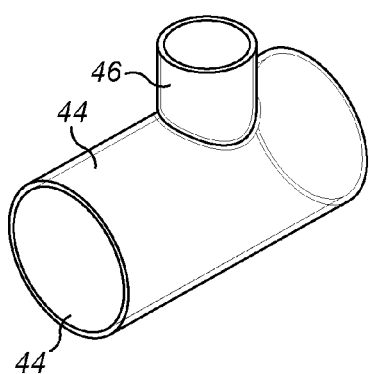
FIG. 10 is a perspective view of an insulating shell being part of the tee assembly shown in FIG. 4.

It is important for continuity of thermal insulation that the tee structures 12 are also insulated. Consequently, FIG. 10 shows a kit of insulating parts, again suitably formed of Izoflex™, shaped to fit together around each tee forging 30. The insulating parts comprise longitudinally-divided part-tubular half-shells 44 arranged to be assembled around the tubular flowline portion 32 of a tee forging 30 and a tubular part 46 arranged to fit around the branch portion 36 of the tee forging 30. The tubular part 46 could extend to cover any pup piece 38 that may be welded to the branch portion 36 as shown in FIG. 7.

Figure 11:
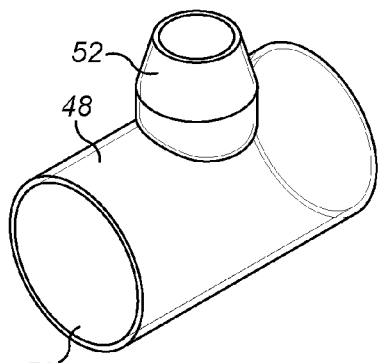
FIG. 11 is a perspective view of an outer shell arranged to fit around the insulating shell of FIG. 10 in the tee assembly of FIG. 4.

Each tee structure 12 of the ILT 10 further comprises outer shell parts 48, 50 of steel as shown in FIG. 11. These outer shell parts 48, 50 enclose the insulating parts 44, 46 around the tee forging 30 and maintain structural continuity along the pipeline 22. The outer shell parts 48, 50 also define a space around the tee forging 30 that communicates with the annulus between the inner and outer pipes 26, 42.

The outer shell parts 48, 50 are longitudinally-divided part-tubular upper and lower half-shells 48, 50 respectively that are arranged to be assembled around the insulating parts 44, 46 shown in FIG. 10. The upper half-shell 48 comprises a tubular extension 52 that surrounds the tubular insulating part 46 around the branch portion 36 of a tee forging 30.

Having described the various components of the ILT 10, reference is now made to FIGS. 12 to 23 to describe how those components are assembled to make the ILT 10.

Figure 12:
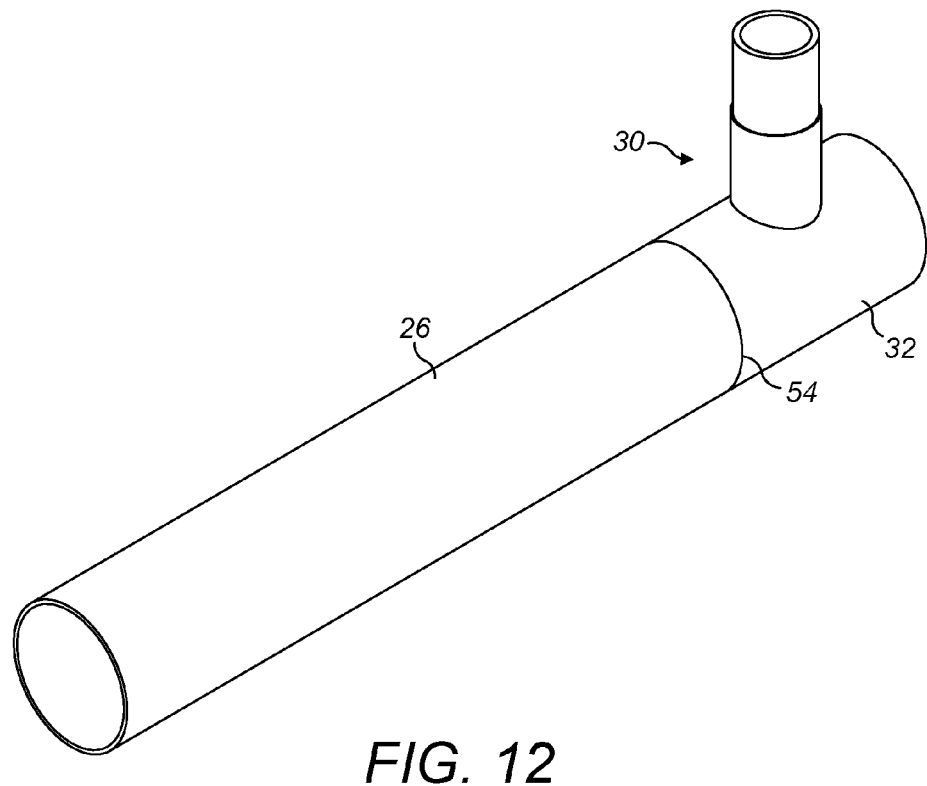
FIG. 12 is a perspective view of a first tee forging of FIG. 7 welded to a first end of the inner pipe of FIG. 5.
Figure 13:
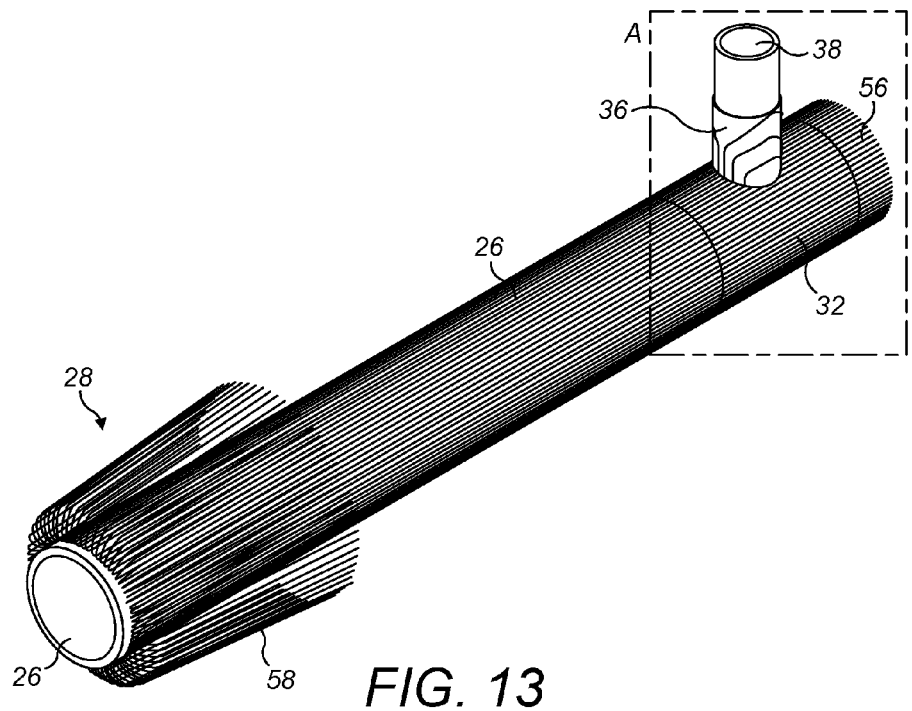
FIG. 13 is a perspective view of the heater wiring of FIG. 6 placed around the assembly of the tee forging and inner pipe shown in FIG. 12.

FIG. 12 shows the first step of welding the flowline portion 32 of a first tee forging 30 to a first end of the inner pipe 26. A welded interface 54 between the first tee forging 30 and the inner pipe 26 results. Next, the wiring elements 28 are added as shown in FIG. 13, extending along the inner pipe 26 and in heat-conducting contact with its outer surface. The wiring elements 28 are angularly spaced around the outer circumference of the inner pipe 26 and extend longitudinally in a direction parallel to the central longitudinal axis of the inner pipe 26.

As FIG. 13 shows, the wiring elements 28 extend continuously—without joins, connectors or junctions—from the inner pipe 26 onto and along the length $L_2$ of the flowline portion 32 of the first tee forging 30. In the example shown, the wiring elements 28 extend further, slightly beyond the length $L_2$ of the flowline portion 32 to overlap the exposed main end 34 of the first tee forging 30. A short overlength 56 of the wiring elements 28 results at that main end 34.

Figure 14:
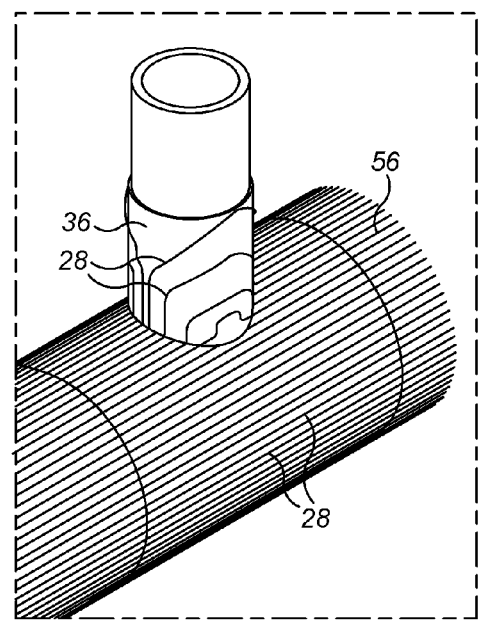
FIG. 14 is an enlarged detail perspective view corresponding to Detail A of FIG. 13, showing placement of the heater wiring around the tee forging.

Detail A of FIG. 13 and the corresponding enlargement of FIG. 14 show wiring elements 28 that intersect the branch portion 36 of the first tee forging 30. Those wiring elements 28 are shaped to follow the curvature of the branch portion 36 and so to convey heat to production fluid flowing in the branch portion 36. In this example, eight of the wiring elements are shaped in this way, four to each side of the branch portion 36.

FIG. 13 also shows that the wiring elements 28 extend continuously—again without joins, connectors or junctions—to and beyond the opposite, free end of the inner pipe 26. Here, a substantial overlength 58 of the wiring elements 28 is shown bent back from the free end of the inner pipe 26 to expose that end for subsequent assembly steps as will be described.

It follows from the above that the continuous length $L_c$ of the wiring elements 28 without joins, connectors or junctions is equal to or preferably greater than $L_1+L_2$. $L_1+L_2$ is the aggregate length of the assembly of the inner pipe 26 and the flowline portion 32 of the first tee forging 30 as shown in FIG. 12.

Figure 15:
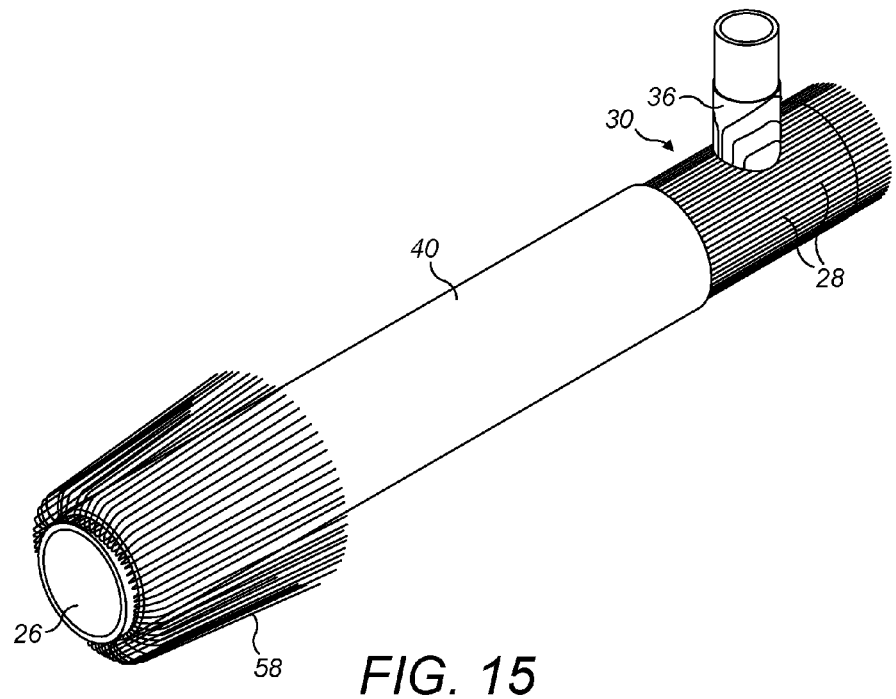
FIG. 15 is a perspective view of the insulating sleeve of FIG. 8 placed around the heater wiring on the inner pipe shown in FIG. 13.
Figure 16:
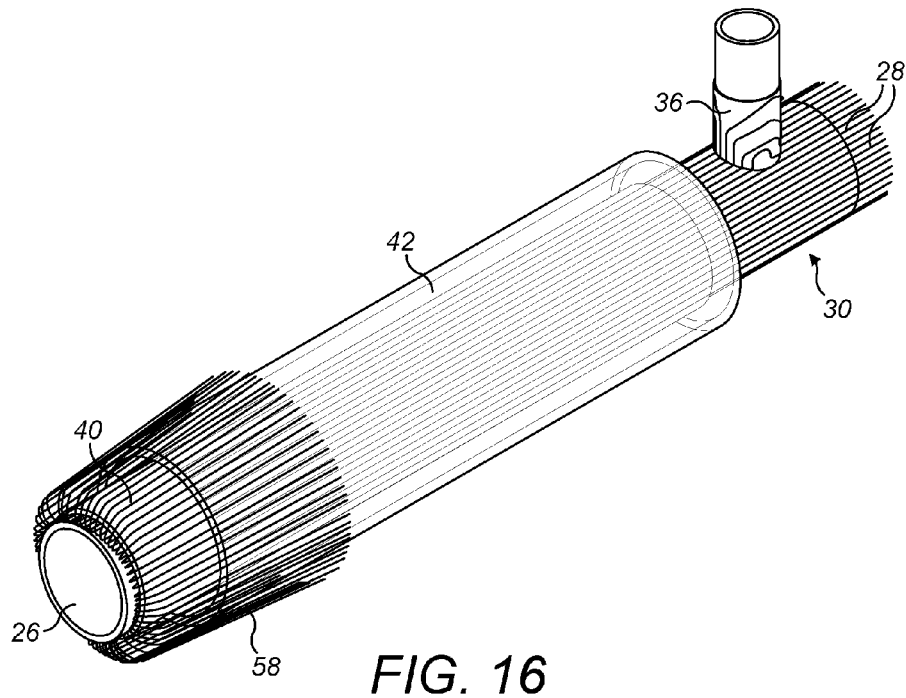
FIG. 16 is a perspective view of the outer pipe of FIG. 9 placed around the assembly of the insulating sleeve on the heater wiring that rests against the inner pipe shown in FIG. 15.

Next, FIG. 15 shows the insulating sleeve 40 placed around the wiring elements 28 on the inner pipe 26 and FIG. 16 shows the outer pipe 42 slid into place on top of the insulating sleeve 40. The branch portion 36 of the first tee forging 30 can be used conveniently as a stop for both of those assembly operations if desired.

Care must be taken not to damage the wiring elements 28 during assembly operations. For example, the overlength 58 of the wiring elements 28 at the free end of the inner pipe 26 can be bent inwardly to allow the sleeve 40 and the outer pipe 42 to be slid over the overlength 58 if desired, before being bent back again to expose that end of the inner pipe 26 as shown in FIG. 16.

Figure 17:
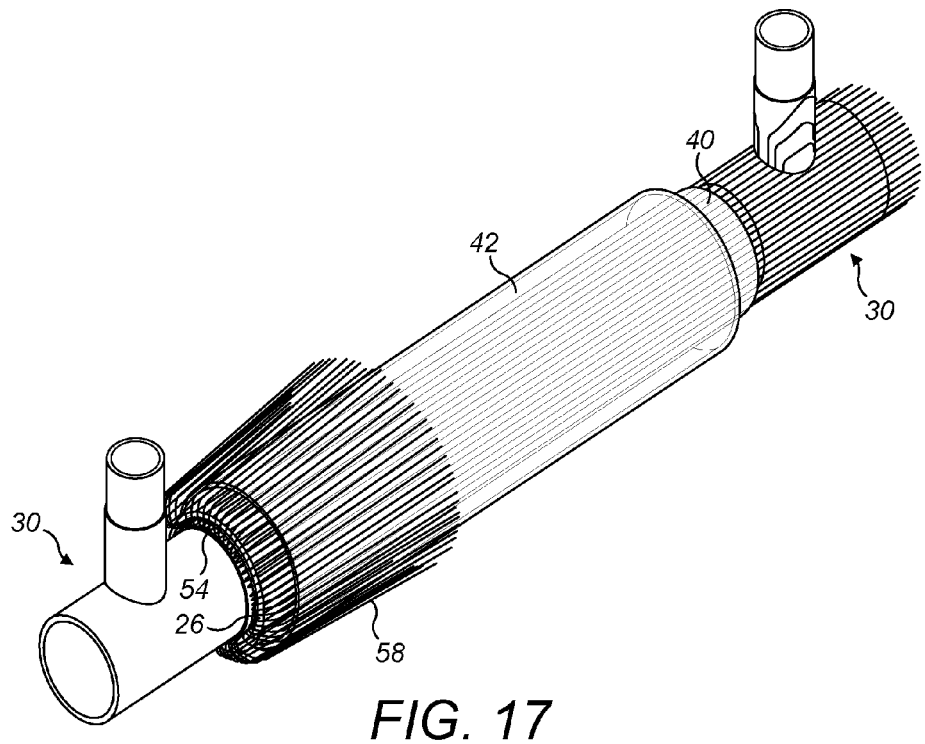
FIG. 17 is a perspective view of a second tee forging of FIG. 7 welded to a second end of the inner pipe in the assembly of FIG. 16.
Figure 18:
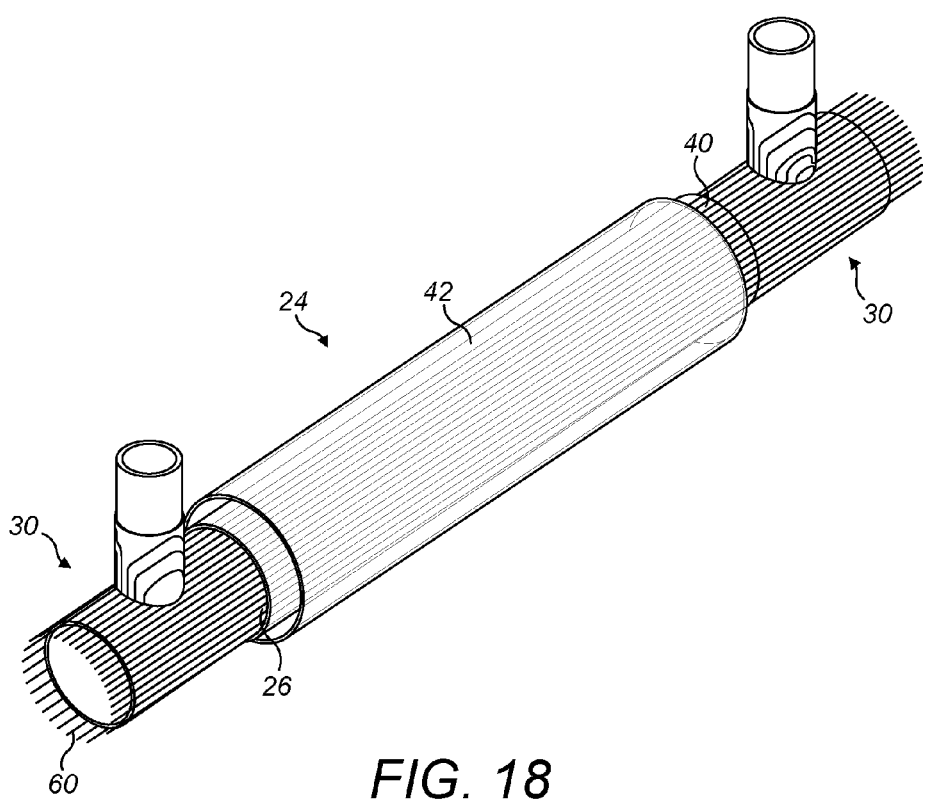
FIG. 18 is a perspective view of an over-length of the heater wiring in the assembly of FIG. 16 now placed around the second tee forging to complete the tee assembly, as also shown in FIG. 4.
Figure 19A:
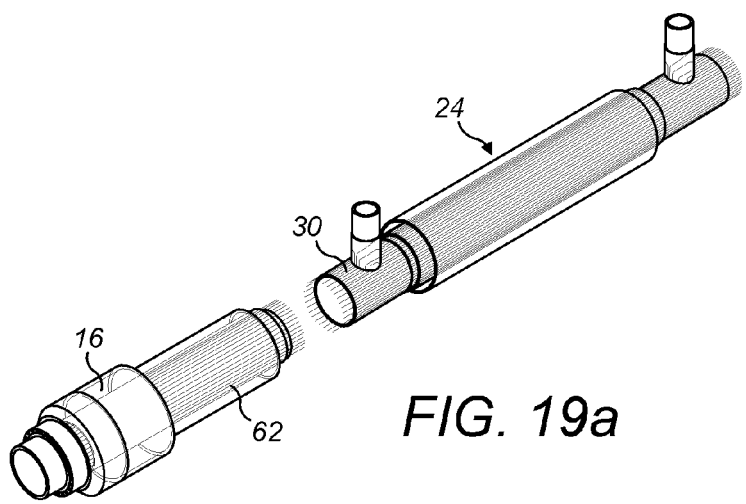
FIGS. 19a, 19b and 19c are a sequence of perspective views showing attachment by welding of the penetrator couplings of FIG. 3 to the tee forgings at respective ends of the tee assembly shown in FIG. 18.
Figure 19B:
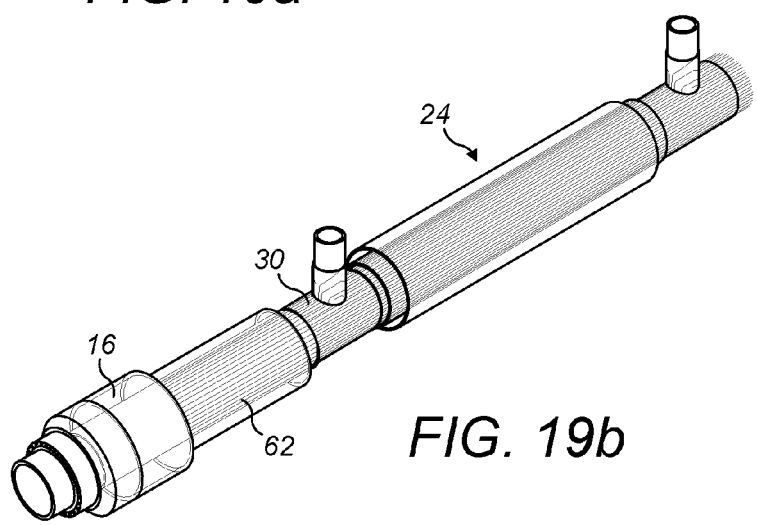
Figure 19C:
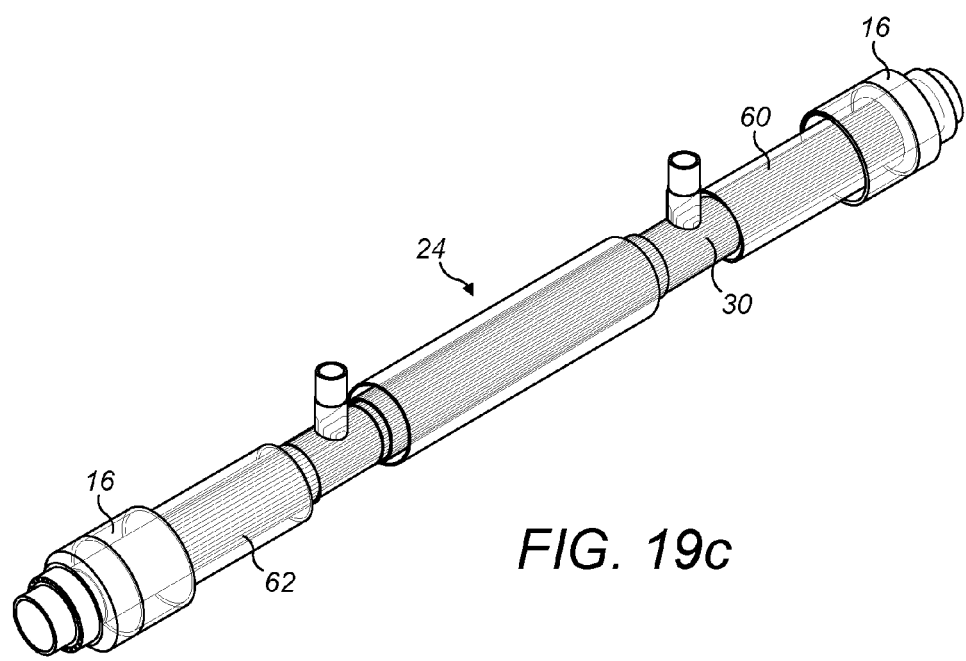

FIG. 17 shows the flowline portion 32 of a second tee forging 30 welded to the free end of the inner pipe 26. This creates a second welded interface 54 between the second tee forging 30 and the inner pipe 26. Next, as shown in FIG. 18, the overlength 58 of the wiring elements 28 is laid around the second tee forging 30 in a manner similar to the arrangement shown in FIGS. 13 and 14. Again, in the example shown, the wiring elements 28 extend further, slightly beyond the length $L_2$ of the flowline portion 32 to overlap the exposed main end 34 of the second tee forging 30. Thus, the overlength 58 is longer than $L_2$, leaving another short overlength 60 of the wiring elements 28 remaining at that main end 34.

The flowline portions 32 of the first and second tee forgings 30 need not be identical in length. Thus, one flowline portion 32 could have a length $L_2$ and the other flowline portion 32 could have a length $L_3$ that is greater than or less than $L_2$. Where $L_2$ and $L_3$ are not identical, the continuous length of the wiring elements 28 without joins, connectors or junctions ($L_c$) could be equal to or preferably greater than $L_1+L_2+L_3$. Where $L_2=L_3$, the expression may be shortened to $L_c \geq L_1+2L_2$ Turning next to FIGS. 19a, 19b and 19c, these show attachment of the penetrator couplings 16 to the first and second tee forgings 30 of the tee assembly 24. Each penetrator coupling 16 includes a PiP section 62 that corresponds to the inner and outer pipes 26, 42 of the flowline portion 14. Similarly, an annulus between inner and outer pipes of that PiP section 62 contains insulation and wiring elements that are similar to those of the flowline portion 14.

Successive welding operations performed on the inner pipes of the PiP sections 62 attach the penetrator couplings 16 to the exposed main ends 34 of the first and second tee forgings 30.

The annulus defined by the PiP section 62 of each penetrator coupling 16 is open at an inner end facing the associated tee forging 30. Conversely, that annulus is closed at an outer end facing away from the associated tee forging 30. The annulus is suitably closed by a welding a bulkhead between the inner and outer pipes of the PiP section 62 or by swaging the outer pipe inwardly to be welded to the inner pipe.

Figure 20:
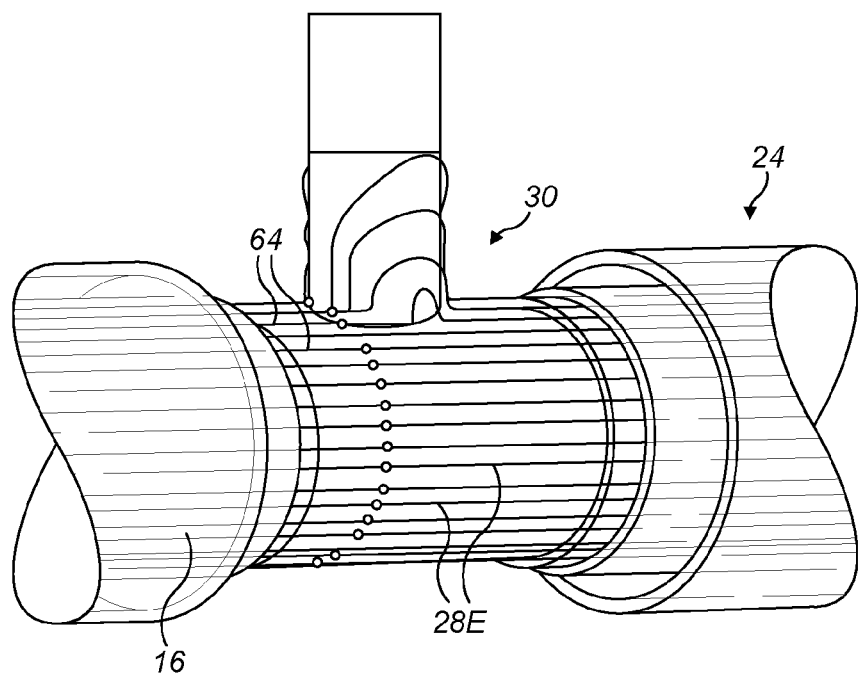
FIGS. 20 and 21 are enlarged detail views of the interface between a penetrator coupling and a tee forging as shown in FIGS. 19b and 19c, showing details of connections between heater wiring of the tee assembly and of the penetrator coupling.
Figure 21:
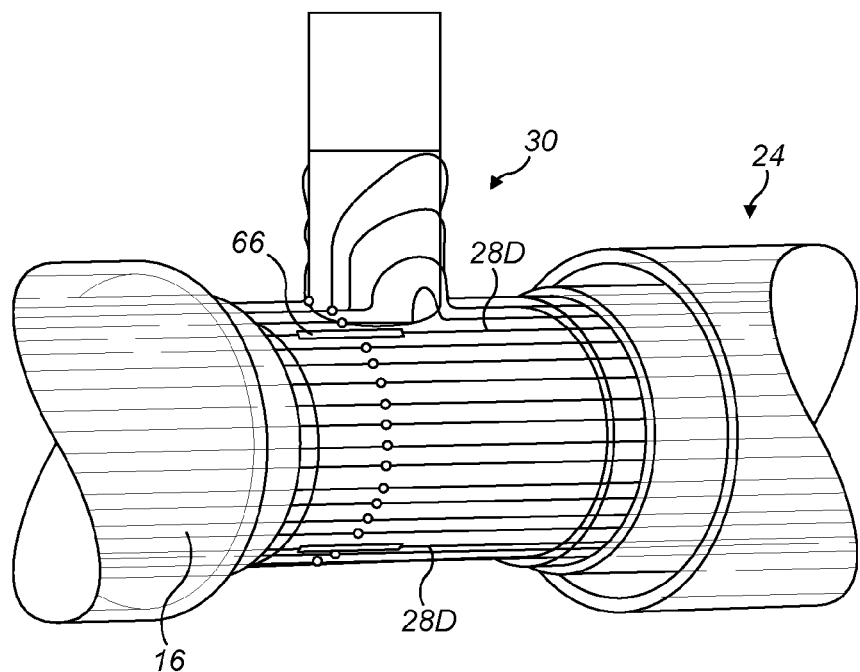

After attachment of the penetrator couplings 16, the arrangement of wiring elements 28 around each tee forging 30 is shown in FIGS. 20 and 21. Here, connections are made between the wiring elements 28 and counterpart wiring elements 64 of a penetrator coupling 16, namely welding of electrical heating elements 28E as shown in FIG. 20 and fibre-optic welding of data-carrying elements 28D as shown in FIG. 21, the latter connections also involving junction boxes 66.

The wiring elements 64 of a penetrator coupling 16 may also overlap the free end of the PiP section 62 to create an overlength. In that case, connection between the wiring elements 28 and the counterpart wiring elements 64 may conveniently and accessibly be effected on a tee forging 30 as FIGS. 20 and 21 show. It would also be possible to effect connection between the wiring elements 28 and the counterpart wiring elements 64 on the PiP section 62 of a penetrator coupling 16.

By way of example, the wiring elements 28 may comprise thirty-six electrical heating elements 28E and three data-carrying elements 28D. Each electrical and fibre-optic connection must be tested from one penetrator coupling 16 to the other penetrator coupling 16.

Figure 22:
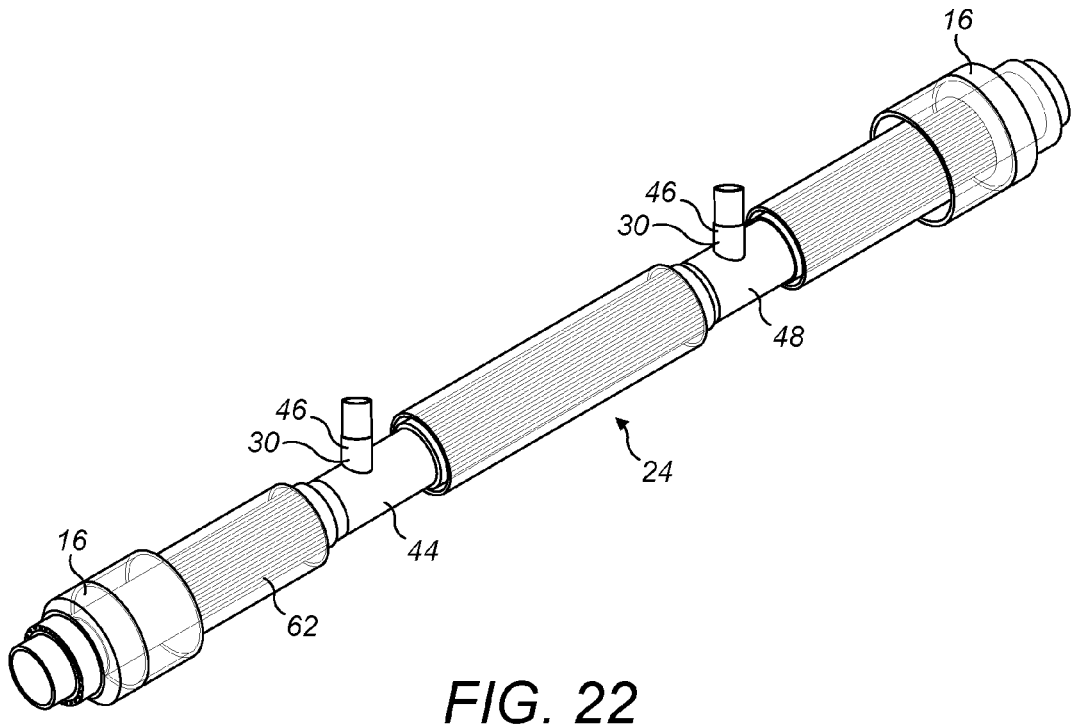
FIG. 22 is a perspective view showing insulating shells of FIG. 10 assembled around the tee forgings of the tee assembly.
Figure 23:
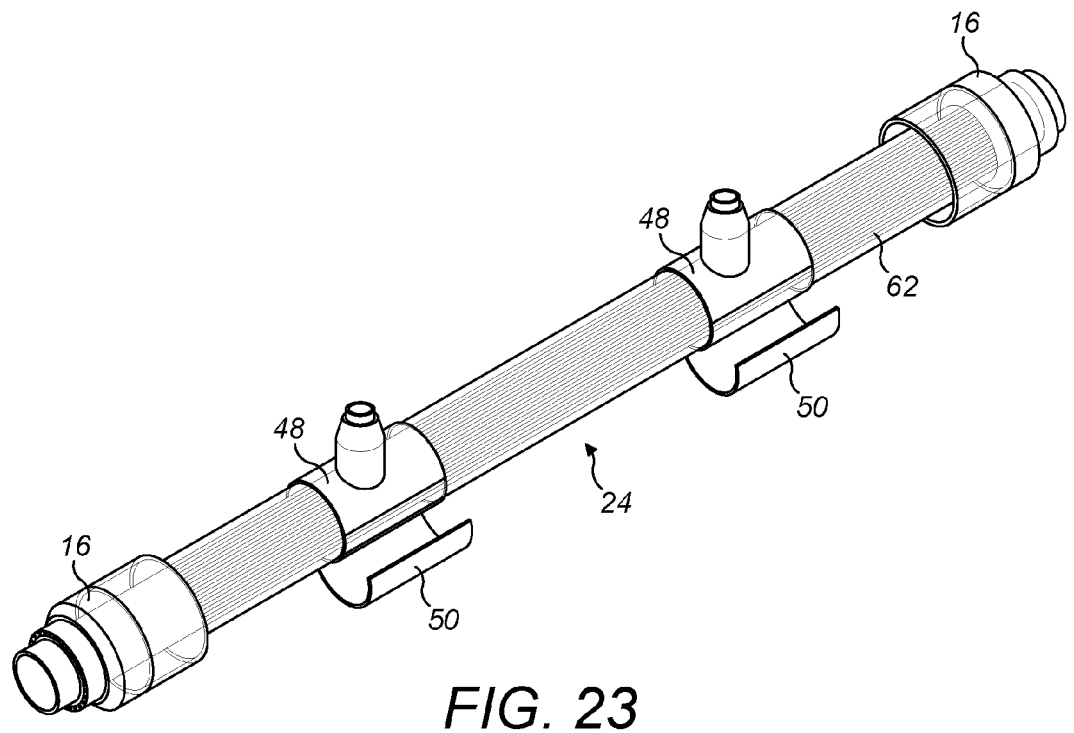
FIG. 23 is a perspective view showing outer shells of FIG. 11 being assembled around the insulating shells of FIG. 10.
Figure 24:
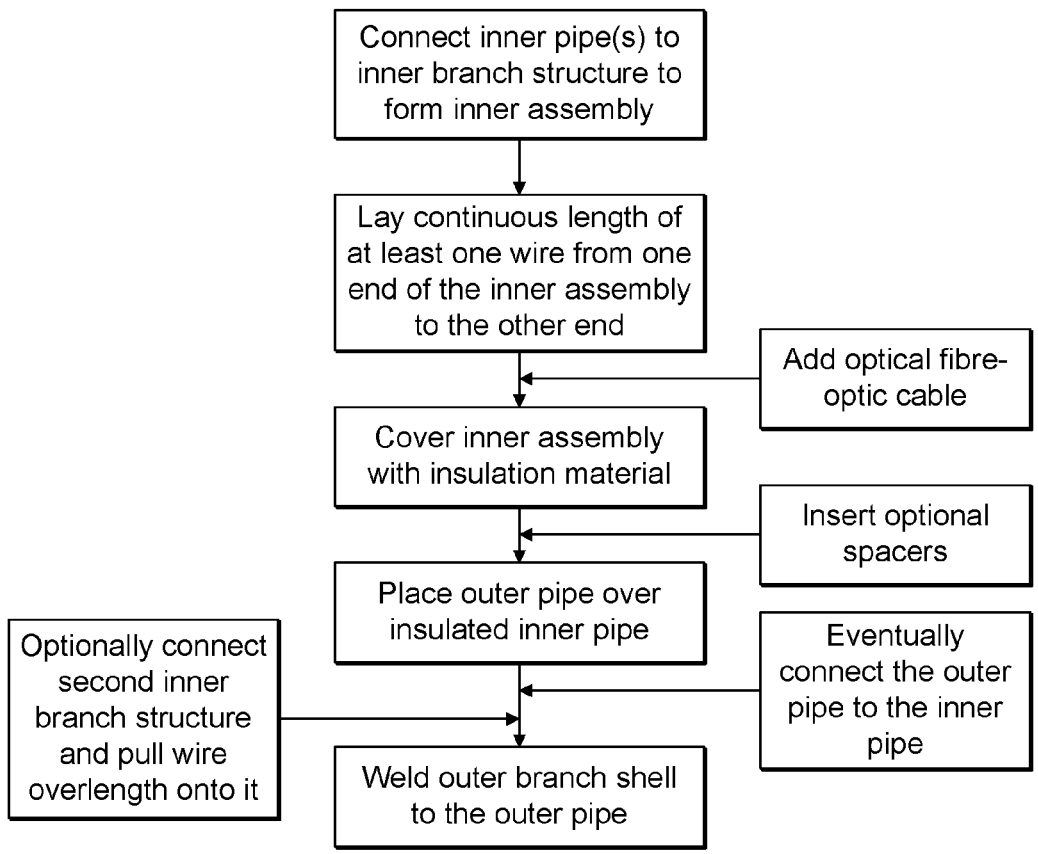
FIG. 24 is a flow diagram illustrating methods of the invention.

FIGS. 22 and 23 show the ILT 10 being completed by assembly of the insulating parts 44, 46 around the tee forgings 30 and then by assembly of the outer shell parts 48, 50 around the insulating parts 44, 46. The outer shell parts 48, 50 are welded to the outer pipe 42 and to the penetrator couplings 16 by circumferential girth welds. The outer shell parts 48, 50 are also welded to each other by longitudinal seam welds.

Finally, air is pumped out of the communicating spaces between the inner and outer pipes 26, 42 of the flowline portion 14, between the tee forgings 30 and the outer shell parts 48, 50 and between the inner and outer pipes of the PiP sections 62 of the penetrator couplings 16 to create a partial vacuum in those spaces. A hole through a wall of one of the outer components, for example in the outer pipe 42, may be provided to connect a suction line for this purpose. Such a hole is plugged and sealed after use to maintain the partial vacuum. A valve or connector may also be welded to close the generally annular space around the tee forging.

Creating a partial vacuum in the generally annular spaces in this way is optional and may not be necessary in all applications, for example if a different insulating material such as an aerogel is used.

FIG. 24 is a flow diagram that outlines principal steps of the method described above.

Figure 25:
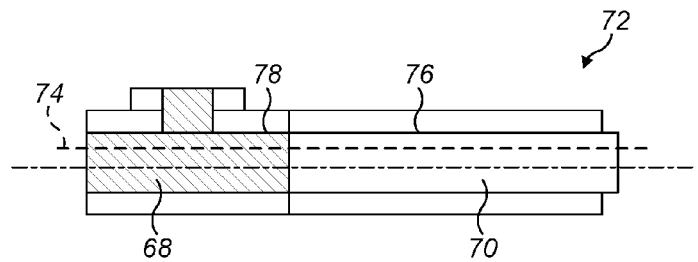
FIGS. 25 to 27 are schematic side views of some variants of the invention.
Figure 26:
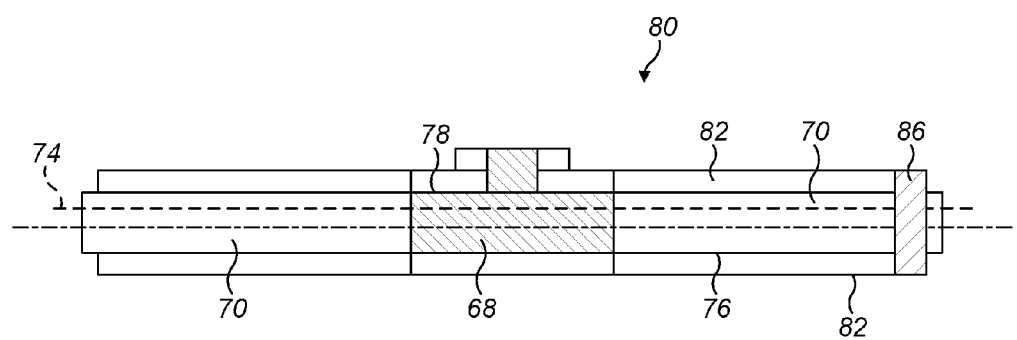
Figure 27:
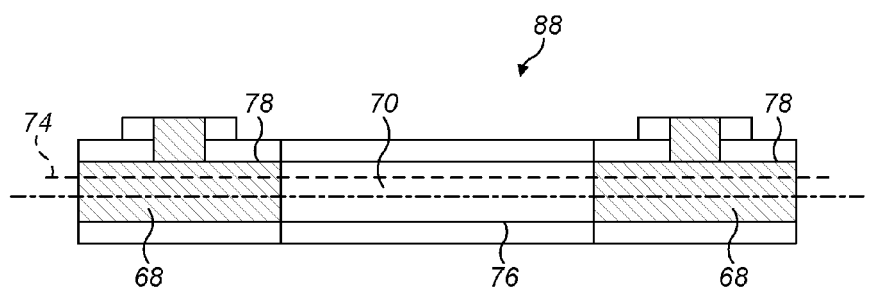

Finally, FIGS. 25 to 27 show schematically how the invention may be applied to various combinations of double-walled branch structures and PiP pipe lengths. Like numerals are used for like parts.

FIG. 25 shows a tee 68 welded end-on to a pipe length 70 to form an assembly 72, with at least one heating wire 74 extending continuously from one end of that assembly 72 to the other end. The wire 74 extends along an inner pipe 76 of the pipe length 70 and across an inner tee structure 78 of the tee 68, without intermediate joins, connectors or junctions in the wire 74.

FIG. 26 shows a tee 68 disposed between two pipe lengths 70 to form an assembly 80. On one of those pipe lengths 70, an annulus 82 between the inner pipe 76 and an outer pipe 84 is closed at one end by a bulkhead 86 that is suitably welded to the inner pipe 76 and the outer pipe 84. Again, at least one heating wire 74 extends continuously from one end of the assembly 80 to the other end, without intermediate joins, connectors or junctions in the wire 74. Thus, the wire 74 extends along the inner pipes 76 of the pipe lengths 70, across an inner tee structure 78 of the tee 68 and through the bulkhead 86.

FIG. 27 shows two tees 68 at respective ends of a pipe length 70 to form an assembly 88. Again, at least one heating wire 74 extends continuously from one end of the assembly 88 to the other end, without intermediate joins, connectors or junctions in the wire 74. Thus, the wire 74 extends along the inner pipe 76 of the pipe length 70 and across inner tee structures 78 of the tees 68.

Many variations are possible within the inventive concept. For example, an ILT or other branch structure of the invention need not have couplings such as the penetrator couplings of the embodiments described above; the structure could instead be welded directly to adjoining pipe lengths of a pipeline.

In the simple examples described above, the branch portion 36 of a tee forging has a central longitudinal axis that is orthogonal to the central longitudinal axis of the flowline portion 32. However, other angles are of course possible between a flowline portion and a branch portion while allowing them to intersect and communicate with each other.

Electrical heating may be effected by resistive heating, by inductive heating or by direct electrical heating known in the art by the acronym DEH.

The invention claimed is:

1. A flowline branch structure having:
    at least one inner branch assembly comprising an inner flowline branch and at least one inner flowline pipe attached to and communicating with the inner flowline branch, wherein the inner flowline branch comprises a main tubular bore and at least one secondary tubular bore in fluid communication with the main tubular bore and extending laterally relative to a central longitudinal axis of the main tubular bore;
    at least one outer branch assembly comprising an outer branch housing disposed around the inner flowline branch and at least one outer pipe disposed around the inner flowline pipe and attached to the outer branch housing;
    an annular space defined between the inner and outer branch assemblies; and
    at least one wiring element disposed in the space on an outer side of the inner branch assembly and extending in one continuous length across an interface between the inner flowline pipe and the inner flowline branch, wherein the, or each, wiring element also extends from the interface in one continuous length across a full length of the inner flowline pipe and the inner flowline branch, between opposed ends of the inner branch assembly.

2. The flowline branch structure of claim 1 wherein the, or each, wiring element extends continuously from the interface to overlap beyond an end of the inner flowline pipe or the inner flowline branch, which end is remote from the interface.

3. The flowline branch structure of claim 1, wherein at least one wiring element is an electrical heating element or a data-carrying element.

4. The flowline branch structure of claim 1, wherein at least one wiring element is diverted or branched from a generally longitudinal orientation to lie beside the secondary tubular bore.

5. The flowline branch structure of claim 1, wherein the annular space contains thermally-insulating material that covers an external surface of the inner branch assembly and the, or each, wiring element.

6. The flowline branch structure of claim 1, wherein the annular space is sealed.

7. The flowline branch structure of claim 1, and comprising:
    first and second inner branch assemblies, each comprising an inner flowline branch;
    at least one inner flowline pipe attached to and communicating with the inner flowline branch of at least one of the inner branch assemblies;
    first and second outer branch assemblies each comprising an outer branch housing disposed around a respective inner flowline branch and at least one outer pipe disposed around the inner flowline pipe and attached to the outer branch housing; and
    an annular space defined between the first and second inner branch assemblies and the first and second outer branch assemblies.

8. A subsea flowline or a subsea installation comprising at least one of the flowline branch structures of claim 1.

9. A flowline branch structure having:
    at least one inner branch assembly comprising an inner flowline branch and at least one inner flowline pipe attached to and communicating with the inner flowline branch, wherein the inner flowline branch comprises a main tubular bore and at least one secondary tubular bore in fluid communication with the main tubular bore and extending laterally relative to a central longitudinal axis of the main tubular bore;
    at least one outer branch assembly comprising an outer branch housing disposed around the inner flowline branch and at least one outer pipe disposed around the inner flowline pipe and attached to the outer branch housing;
    an annular space defined between the inner and outer branch assemblies; and
    at least one wiring element disposed in the space on an outer side of the inner branch assembly and extending in one continuous length across an interface between the inner flowline pipe and the inner flowline branch, wherein the, or each, wiring element is interrupted or terminated by a connection disposed on the inner flowline branch.

10. A method of constructing a flowline branch structure, comprising laying at least one wiring element on an outer side of an inner branch assembly having at least one inner flowline pipe attached to an inner flowline branch, to extend in one continuous length across an interface between the inner flowline pipe and the inner flowline branch and across a full length of the inner flowline pipe and the inner flowline branch, between opposed ends of the inner branch assembly, wherein the inner flowline branch comprises a main tubular bore and at least one secondary tubular bore in fluid communication with the main tubular bore and extending laterally relative to a central longitudinal axis of the main tubular bore.

11. The method of claim 10, comprising laying the, or each, wiring element to extend continuously from the interface to overlap beyond an end of the inner flowline pipe or the inner flowline branch, which end is remote from the interface.

12. The method of claim 11, comprising attaching a further inner flowline pipe or inner flowline branch to the inner branch assembly and laying the overlap of the, or each, wiring element on that further inner flowline pipe or inner flowline branch.

13. The method of claim 12, wherein the overlap extends in one continuous length across a full length of the further inner flowline pipe or inner flowline branch.

14. The method of claim 10, further comprising attaching at least one inner flowline pipe to the inner flowline branch before laying the wiring element.

15. The method of claim 10, further comprising laying thermally-insulating material over an outer side of the inner branch assembly and upon the, or each, wiring element.

16. The method of claim 10, further comprising placing an outer branch housing around the inner flowline branch and at least one outer pipe around the inner flowline pipe, and attaching the outer pipe to the outer branch housing to define an annular space between the inner branch assembly and an outer branch assembly comprising the outer branch housing and the outer pipe.

* * * * *